(12) United States Patent
Costa et al.

(10) Patent No.: US 10,912,305 B2
(45) Date of Patent: Feb. 9, 2021

(54) USE OF A CHESTNUT TANNIN EXTRACT AS ACARICIDAL AGENT

(71) Applicant: SADEPAN CHIMICA S.r.l., Viadana (IT)

(72) Inventors: Gianluca Costa, Gussola (IT); Dario Gozzi, Viadana (IT); Mattia Ferrante, Parma (IT); Pierluigi Zambelli, Casalmaggiore (IT)

(73) Assignee: SADEPAN CHIMICA S.R.L., Viadana (IT)

( * ) Notice: Subject to any disclaimer, the term of this patent is extended or adjusted under 35 U.S.C. 154(b) by 429 days.

(21) Appl. No.: 15/861,782

(22) Filed: Jan. 4, 2018

(65) Prior Publication Data

US 2018/0184667 A1   Jul. 5, 2018

(30) Foreign Application Priority Data

Jan. 5, 2017   (IT) .................. 102017000001121

(51) Int. Cl.
*A01N 65/08* (2009.01)
*A01N 31/16* (2006.01)
*A01N 25/00* (2006.01)
*A61K 36/49* (2006.01)

(52) U.S. Cl.
CPC ............. *A01N 65/08* (2013.01); *A01N 25/00* (2013.01); *A01N 31/16* (2013.01)

(58) Field of Classification Search
None
See application file for complete search history.

(56) References Cited

FOREIGN PATENT DOCUMENTS

| CA | 868958 A | 4/1971 |
| IT | RE20000089 A1 | 3/2002 |
| JP | H09194493 A | 7/1997 |
| JP | 2000247820 A | 9/2000 |
| JP | 2008072961 A | 4/2008 |
| JP | 2010180131 A | 8/2010 |
| WO | 9953763 A1 | 10/1999 |
| WO | WO-2004028250 A2 * | 4/2004 ............. A01N 59/00 |

OTHER PUBLICATIONS

Comandini, et al., Food Chem., 157:290. (Year: 2014).*
Castro, et al., Green Materials for Energy, Products and Depollution, Environmental Chemistry for a Sustainable World 3. (Year: 2013).*
Dispersants, vol. 8, Kirk-Othmer Encyclopedia of Chemical Technology. (Year: 2003).*
Sarwar, M., Int'l. J. Mat. Chem. and Phys., 1:116. (Year: 2015).*
Italian Search Report and Written Opinion, Habermann, Jorg, dated Jun. 7, 2017.
Merle Juliette et al: "New biobased foams from wood byproducts", Materials & Design, vol. 91, Nov. 22, 2015 (Nov. 22, 2015), pp. 186-192.
Bargiacchi et al: "Biostimulant activity of hydrolyzable tannins from sweet chestnut (*Castanea sativa* mill.)", ISHS Acta Horticulturae, Jan. 1, 2013 (Jan. 1, 2013), pp. 111-116.
L. Maistrello et al: "Effect of chestnut tannins on the root-knot nematode Meloidogyne javanica"Helminthologia, vol. 47, No. 1, Jan. 1, 2010 (Jan. 1, 2010), pp. 48-57.
Fernandez-Salas A et al: "In vitro acaricidal effect of tannin-rich plants against the cattle tick *Rhipicephalus* (Boophilus) microplus (Acari: Ixodidae)", Veterinary Parasitology, Elsevier Science, Amsterdam, NL, vol. 175, No. 1-2,Jan. 10, 2011 (Jan. 10, 2011), pp. 113-118.
Fadi Hassanat et al: "Assessment of the effect of condensed (acacia and quebracho) and hydrolysable (chestnut and valonea) tannins on rumen fermentation and methane production in vitro : Impact of condensed and hydrolysable tannins on methane production in vitro", Journal of the Science of Food and Agriculture, vol. 93, No. 2, Jun. 27, 2012 (Jun. 27, 2012), pp. 332-339.

* cited by examiner

*Primary Examiner* — Michael Barker
(74) *Attorney, Agent, or Firm* — Florek & Endres PLLC (57) ABSTRACT

The use is described of a chestnut tannin extract (*Castanea sativa* Mill.), as a non-phytotoxic acaricidal agent, alone or in a mixture with other active principles having an acaricidal activity.

20 Claims, 5 Drawing Sheets

USE OF A CHESTNUT TANNIN EXTRACT AS ACARICIDAL AGENT

The present invention relates to the use of a chestnut tannin extract (*Castanea sativa* Mill.) as acaricidal agent, alone and/or in a mixture with other active principles having an acaricidal activity.

In particular, the object of the present invention relates to the use of a chestnut tannin vegetable extract, as described in greater detail hereunder.

An important component of vegetable biomass consists of tannin, a group of phenolic compounds very common in plants (pteridophytes, gymnosperms, angiosperms), found in fruits, barks and, above all, in wood.

From a chemical point of view, tannin has an extremely complex structure and a number molecular weight ranging from 500 to 3,000 Daltons.

The classification of tannin is not easy due to the variety of compounds; universally, however, tannins in nature are divided into two main classes: hydrolyzable and condensed tannins.

Hydrolyzable tannins are esters of gallic acid (gallotannins) and ellagic acid (ellagitannins) with a sugar which is generally glucose, and can be hydrolyzed into monomeric products by acids or enzymes.

The chestnut tannin extract to which reference is made for use according to the present invention, is characterized by the presence of hydrolyzable tannins, generally consisting of molecules with phenolic groups such as gallic and ellagic acids, partially or totally esterified with a D-glucose molecule.

Condensed tannins, known as proanthocyanidins or polyflavonoids (PA), on the other hand, comprise a group of polyhydroxyflavonol polymers with C—C bonds between the subunits.

As information on the structure of these products increases, the above distinction between hydrolyzable tannins and condensed tannins tends to disappear as condensed tannins can also contain gallic esterified at the 3-OH level of the C ring.

The key characteristic which determines the properties of tannins seems to be the unusually high local concentration of ortho-phenolic hydroxyl groups and the biological activity of tannins appears to be at least partly linked to the molar content of these ortho-phenolic groups and their spatial concentration.

In hydrolyzable tannins, these are mainly associated with derivatives of gallic or ellagic acid.

In condensed tannins (procyanidins, prodelphinidins), phenolic hydroxyls of the B ring play the same role (esterified gallate can also contribute).

Hydrolyzable tannins are generally more powerful biological agents, per unitary mass, than condensed tannins and the capacity of precipitating proteins by these tannins is directly connected with the number of groups deriving from esterified gallic acid.

This feature allows tannins to form even large complexes, especially with proteins, but also with other macromolecules such as cellulose and pectins.

The non-reversible reaction with proteins is extremely interesting, as it can make them precipitate from the solutions.

This propriety is specifically the prerequisite for the use of tannins in industry as vegetable tanning agents. Tannins are also used as fertilizers, as agents for promoting a starter effect in crops and as antioxidants.

The Applicant has now surprisingly found that chestnut tannin extract has a high acaricidal activity also at low doses, and at the same is well tolerated by agrarian crops.

The term acaricidal refers to substances capable of controlling, limiting, rejecting or destroying mites.

The chestnut tannin extract according to the present invention is obtained by means of a process, without the use of chemical additives, which comprises an extraction step in water by leaching starting from vegetable biomasses, filtration steps, concentration steps with physical means, and a possible final drying step.

More specifically, the chestnut tannin extract, whose use as acaricide is object of the present invention, is obtained by leaching a vegetable biomass according to a completely "clean" process, i.e. without the aid of any chemical substance.

The term vegetable biomass refers to a biomass comprising any part of the plant: trunk, leaves, branches, bark, alone or in any combination thereof.

More specifically, the chestnut tannin extract, whose use is object of the present invention, is obtained by means of a leaching process described in detail in Italian patent IT1318355: the woody chestnut biomass, in the form of pieces of wood (or chips) having dimensions in the order of about 20×40×5 mm, is subjected to a repeated leaching process, in which the biomass always remains in the same autoclave, whereas the extraction water moves from one autoclave to the next. The whole plant, in fact, consists of a battery of 8 autoclaves each of 20 cubic metres, connected in a loop.

Each autoclave is equipped with an upper opening for introducing the wood chips (better defined as chipped wood), or of the biomass in general, and a lower opening for discharging the exhausted chips, said openings being closed by respective lids. Each autoclave is composed of a cylindrical body with an upper cap and a truncated-conical bottom, inside which some freely hanging static chains are mounted in order to favour the flow of solid material, and has an upper feeding of the extraction water and a lower discharge duct of said water. The inlet and outlet of the extraction water, the fresh-water inlet and the vent outlet all lead to a collector that collects the analogous ducts of the other 7 autoclaves. All the autoclaves are mounted aligned and are served by a sliding bridge-crane feeder for feeding the chips, or biomass, to each autoclave and the lower discharges of the exhausted wood are arranged vertically on a chain conveyor to allow their removal.

The discharge of the extraction liquid from each autoclave is withdrawn below the same and is fed to the head of the next autoclave.

The concept underlying the whole extraction process is to leach the fresh wood with the penultimate extraction water, whereas, the exhausted wood, on the contrary, undergoes the last leaching with fresh water. The process is therefore defined as "in countercurrent". The weight ratio between the biomass and extraction water varies considerably, depending on the type of biomass used:

when the biomass consists of wood, this ratio is preferably equal to 1:3.33;
when the biomass consists of bark, this ratio is preferably equal to 1:10;
when the biomass consists of leaves, this ratio is preferably equal to 1:20;
when the biomass is made up of an equiponderal mixture of wood (trunk), bark, leaves and branches, this ratio is preferably equal to 1:9.

The extractions are effected:
with overheated fresh water alone, at a temperature generally ranging from 110 to 120° C. and a pressure ranging from 2 bar (initial) to 0.8 bar (final); or
with a mixture composed for 90% of Fraction 6, whose description is specified in greater detail hereunder, and the remaining 10% of fresh water; this mixture is also fed at a temperature generally ranging from 110 to 120° C. and a pressure ranging from 2 bar (initial) to 0.8 bar (final).

At the end of the extraction cycle, the last autoclave, containing exhausted wood, is isolated from the rest of the plant by closing the valves on the relative inlet duct of the extraction liquid. The exhausted chipped wood is then discharged and a new dose of fresh biomass/fresh chestnut wood is then charged. At the end of the extraction cycle of a second autoclave, the autoclave previously isolated is reconnected to the loop (plant) to receive the liquid discharged from a third autoclave at the penultimate leaching cycle. At the end of this leaching treatment, a liquid containing from 1% to 7% by weight of tannin extract is obtained; in particular, when wood is used as biomass, the content of tannin extract preferably ranges from 4% to 6% by weight. Said leaching liquid (or non-filtered tannic broth") is then subjected to the following filtration, concentration and purification steps:

a) a forced filtration step of the leaching liquid, preceded by a very first cooling step at 60-80° C. with plate heat exchangers, through perlite precoat filters: this operation is aimed at eliminating all the foreign particles composed of wood sawdust, soil, sand, colloidal substances, etc.; at the end of this step, "Fraction 1. Filtered tannic broths", is obtained, containing from 1% to 7% by weight, preferably from 4% to 6% by weight, of tannin extract;

b) this fraction is subjected to a first pre-concentration step with the aid of nanofiltration polymeric membranes to obtain two fractions: a diluted fraction containing about 0.5% by weight of tannin extract (Fraction 2. Nanofiltration permeate I) and a more concentrated and turbid fraction containing about 17-20% by weight of tannin extract;

c) the more concentrated fraction is cooled using plate exchangers, to a temperature of about 10-12° C. and left to rest in stainless steel tanks for a time ranging from 24 to 48 hours; during this period, the residual foreign substances, consisting of wood dust, sand, clay, colloids, soil and various insoluble salts, not withheld in the previous filtration step, are separated by gravity, i.e. they sediment, on the bottom of the same tanks, providing a perfectly limpid liquid fraction, following the above clarification step by sedimentation, a mechanical clarification is effected using a centrifuge with vertical-axis disks. The above allows a perfectly clear preconcentrate to be obtained, free of suspended particles higher than about 25 microns (Fraction 3. Nanofiltration concentrate I), whose content of tannin extract is always equal to about 17-20% by weight;

d) "Fraction 3. Nanofiltration concentrate I" can be further concentrated through a second nanofiltration step, effected by means of spiral-wound semi-permeable polymer membranes, thus obtaining two fractions: a more diluted fraction containing about 0.5% by weight of tannin extract (Fraction 4: Nanofiltration permeate II) and a more concentrated fraction at 48-52% by weight of tannin extract (Fraction 5. Nanofiltration concentrate II);

e) "Fraction 2" and "Fraction 4" are then joined and subjected to an reverse osmosis treatment to recover as much of the tannin as possible; at the end of this treatment, two fractions are obtained: a more diluted fraction containing up to a maximum of 0.1% by weight of tannin extract (Fraction 6. Osmosis permeate) and a more concentrated fraction at about 14-16% by weight of tannin extract (Fraction 7. Osmosis concentrate); Fraction 6 is completely re-used in the process upstream of the leaching of the biomass/wood, see above, thus making the whole process free from water discharges.

f) any fraction previously described can be theoretically dried and transformed into powder with the aid of a Spray Dryer (atomizer); Fraction 5 is evidently the most convenient, also for reasons of energy cost, as it has a lower water content and is therefore easier to dry;

g) the liquid concentrate is sprayed into the drying chamber through specific nozzles at a pressure of about 140 bars and a temperature of about 150° C. obtained with hot air preheated by means of a methane vein burner, thus obtaining a powder ("Fraction 8. Powder), containing from 90 to 100% by weight of tannin extract, which can be used as such or in liquid form, after re-dissolution in water. The difference between 90 and 100% by weight of extract depends on the residual humidity present in Fraction 8.

The chestnut tannin extract obtained at the end of this process also contains other components which do not comprise derivatives of gallic or ellagic acid, consisting of:
pentosans, among which xylose and ribose;
hexosans, such as mannan and hemicellulose;
oligosaccharides, in particular xyloglucan and xylan, but also arabinogalactan;
hemicellulose;
simple organic acids, among which: acetic acid, oxalic acid, malic acid, tartaric acid, lactic acid, pyruvic acid, glyceric acid, glycolic acid, citric acid and isocitric acid, ascorbic acid, oxalacetic acid, succinic acid, etc.;
inorganic salts.

Eight fractions have therefore been identified:
1. Filtered tannic broths;
2. Nanofiltration permeate I;
3. Nanofiltration concentrate I;
4. Nanofiltration permeate II;
5. Nanofiltration concentrate II;
6. Osmosis permeate;
7. Osmosis concentrate;
8. Powder.

The present invention therefore relates to the use, as non-phytotoxic acaricide, of chestnut tannin extract composed of a fraction corresponding to a concentrate obtained from a first nanofiltration step (step c)), a fraction corresponding to a concentrate obtained from a second nanofiltration step (step d)), a fraction corresponding to a concentrate obtained from an reverse osmosis step (step e)) or a fraction corresponding to a powder obtained at the end of the drying step (step g)), alone or in any combination thereof.

More specifically, the chestnut tannin extract used as acaricide according to the present invention can be composed of the following fractions:
Fraction 3. Nanofiltration concentrate I
Fraction 5. Nanofiltration concentrate II
Fraction 7. Osmosis concentrate
Fraction 8. Powder
alone or in any combination thereof.

For the purposes of the present invention, without however limiting the application possibilities, the four fractions listed above can therefore be used.

Fraction 8. thus obtained can also be suitably formulated in order to obtain a product, still in powder form, but also having, in addition to the characteristics specified above, the property of being very easily re-dispersed in water. This formulated powder, also object of the present invention, is described in greater detail hereunder, also in the examples.

The chestnut tannin extract can be used alone or in formulation with other active principles having the same acaricide activity: in this case, there is a synergic effect.

In some cases, the mixtures thus obtained, in fact, have a synergic effect between the components, which leads the mixture, for example, to exert a higher activity with respect to that of the individual elements of which it is composed.

An object of the present invention therefore relates to the use of chestnut tannin extract in powder form, or in liquid form, for the control of mites, considered as being a true scourge for agricultural crops.

Examples of mites that can be effectively controlled with chestnut tannin extract are important species of tetranychid mites (*Tetranychus urticae, Tetranychus telarius, Tetranychus cinnabarinus, Tetranychus* sp., *Eotetranychus carpini, Panonychus ulmi, Panonychus citri,* etc.), eriophyid mites (*Phytoptus avellanae, Eriophyes vitis, Eryophies piri, Epitrimerus pyri,* etc.) and tarsonemid mites (*Steneotarsonemus pallidus, Tarsonemus Pallidus* etc.).

Chestnut tannin extract is capable of exerting an acaricidal action of both a curative and preventive nature and exhibits very low or no phytotoxicity on treated crops of agricultural and horticultural interest and zero toxicity against many useful insects and mites, with respect to mammals, fish, birds.

In particular, chestnut tannin extract has proved to be able to exert an acaricidal action on both eggs, and also on moving individuals such as nymphs, pupae or adults.

As indicated above, for practical uses in agriculture, it is often preferable to use chestnut tannin extract suitably formulated in agronomic compositions comprising chestnut tannin extract in powder form and agronomically acceptable co-formulants.

A further object of the present invention therefore relates to non-phytotoxic acaricidal agronomic formulations comprising chestnut tannin extract, one or more surfactants, otherwise called "wetting agents", one or more dispersants and an anti-foam agent, wherein the chestnut tannin extract is extracted in water by leaching, starting from vegetable biomasses and concentrated with physical means, without the use of chemical additives, as described above.

Said co-formulants are agronomically acceptable co-formulants.

An object of the present invention preferably relates to a non-phytotoxic acaricidal agronomic formulation comprising chestnut tannin extract, one or more surfactants, one or more dispersants and an anti-foam agent, wherein the chestnut tannin extract is obtained by means of a process, without the use of chemical additives, which comprises an extraction step in water by leaching, starting from vegetable biomasses, filtration steps, concentration steps with physical means, and a final drying step.

More specifically, the chestnut tannin extract is chestnut tannin extract in powder form (Fraction 8) in a mixture with a surfactant based on sodium alkyl sulfonate, a dispersant based on alkyl naphthalene sulfonates and a chemically and agronomically acceptable anti-foam agent.

The chestnut tannin extract in powder form is preferably present in said agronomic formulation in a quantity ranging from 90 to 95% by weight, the surfactant or wetting agent in a quantity ranging from 2 to 6% by weight, the dispersant in a quantity ranging from 2 to 6% by weight, and the anti-foam agent in a quantity ranging from 1 to 2% by weight, with respect to the total weight of the formulation.

In said agronomic formulation, the surfactant or wetting agent is even more preferably sodium ligninsulfonate and the dispersant is sodium naphthalene sulfonate.

Said agronomic formulation is characterized by an improved redispersibility in water. Compositions can be used that are in the form of dry powders, wettable powders, emulsifiable concentrates, micro-emulsions, pastes, granulates, micro-granulates solutions, suspensions, fumigants, etc.: the selection of the type of composition depends on the specific use.

In order to produce compositions/formulations that are easier to preserve, move and therefore also commercialize, other inert solid co-formulants can also possibly be used, in addition to the co-formulants cited above, such as kaolin, alumina, silica, talc, bentonite, gypsum, quartz, dolomite, attapulgite, montmorillonite, diatomaceous earth, cellulose, starch, etc. Surfactants that can be used are wetting and emulsifying agents of the non-ionic type (polyethoxylated alkyl phenols, polyethoxylated fatty alcohols, etc.), of the anionic type (alkylbenzene-sulfonates, alkylsulfonates, etc.), of the cationic type (alkyl ammonium quaternary salts, etc.)

Dispersing agents that can be used are lignin and its salts, cellulose derivatives, alginates, alkyl naphthalene sulfonates.

There is also the possibility of adding stabilizers (for example antioxidants, UV absorbers, etc.).

The concentration of chestnut tannin extract in the above agronomic compositions can vary within a wide range and depends on various factors. It varies, for example, in relation to the applications for which said compositions are destined, the environmental conditions and the type of formulation adopted.

The concentration of chestnut tannin extract generally ranges from 10 to 100% by weight with respect to the total weight of the composition, preferably from 25 to 95% by weight. Chestnut tannin extract as such or formulated can be used in a mixture with other active principles having an acaricidal, fungicidal or nematocide/nematostatic activity or also with herbicides, bactericides, biostimulants, etc. for broadening the spectrum of action, preventing the resistance of undesired organisms and, at the same time, not showing toxicity towards plants, animals and human beings.

It should be remembered, in fact, that one of the great advantages of chestnut tannin extract with respect to other products already present on the market, is that this is a totally natural product, whose extraction process involves only the use of water and is completely free from water discharges, as described above.

As already mentioned, in some cases, the mixtures thus obtained have a synergic effect between the components, which causes the mixture, for example, to exert a higher activity with respect to that of the individual elements of which it is composed.

Examples of active principles having an acaricidal activity that can be added to compositions containing chestnut tannin extract, are the following: Hexythiazox, Hexythiazox-derivati, Clofentezine, Clofentezine-derivati, Etoxazolo, Fenpyroximate, Pyridaben, Fenazaquin, Fenazaquin-derivati, Tebufenpyrad, etc.

If the compositions comprise chestnut tannin extract and at least a further known active principle, the weight ratios, in the above compositions, between chestnut tannin extract and known active principles vary according to the preselected compounds and can be included within the range of 1:0.001 to 1:2, preferably from 1:0.01 to 1:0.4.

The total concentration of active components in the above compositions can vary within a wide range; in general, it ranges from 10%, preferably from 30%, to 100% by weight with respect to the total weight of the composition.

The chestnut tannin extract or compositions/formulations containing it can be applied to the crop by foliar application, or to the soil by means of fertigation, or drip irrigation, or traditional fertilization, or incorporation into the ground, or by seed tanning. The most widely-used and effective application, however, is by means of liquid spraying directly on the crop to be treated. If the application provides for use in liquid form, the chestnut tannin extract, if in powder form, can be first re-dispersed in water.

A further object of the present invention also relates to a method for controlling mites in crops of agricultural and horticultural interest which consists in applying effective and non-phytotoxic doses of compositions comprising chestnut tannin extract and, optionally, one or more known active principles having an acaricidal activity, compatible therewith, on any part of the plant to be protected.

The quantity of chestnut tannin extract to be applied for obtaining the desired effect can vary in relation to various factors such as, for example, the crop to be protected, the degree of infestation, the climatic conditions, the features of the soil, the method of application, etc.

Doses of chestnut tannin extract ranging from 100 g to 10,000 g per hectare, preferably from 500 g to 8,000 g per hectare, of agricultural crop or, in the case of compositions comprising other known active principles, overall doses of active principles ranging from 200 g to 10,200 g per hectare, preferably from 600 g to 8,200 g per hectare, of agricultural crop, generally provide a sufficient control.

EXAMPLES

The following examples are provided for purely illustrative purposes of the present invention and should not be considered as limiting the protection scope, as defined by the enclosed claims.

Example 1

Preparation and Production of a Tannin Extract

Applying the aforementioned method of hot aqueous extraction (leaching) of chestnut wood and cold fractionation using the membrane technology, 6,000 kg of chestnut wood were treated with 20,000 kg of fresh water and the following eight fractions were obtained and analyzed:
1. Filtered tannic broths;
2. Nanofiltration permeate I;
3. Nanofiltration concentrate I;
4. Nanofiltration permeate II;
5. Nanofiltration concentrate II;
6. Osmosis permeate;
7. Osmosis concentrate;
8. Powder.

A Luna C18 column of 250×4.60 mm, 5 μm (Phenomenex, Torrance, Calif.), was used for the HPLC analysis of the single fractions, the mobile phase used consisted of $H_2O$ (pH 3.2 for HCOOH), (A) and $CH_3CN$ (B). A four-ramp linear gradient was applied, a flow-rate of 0.8 ml/min, for 55 minutes. The elution profile used is the following: initially 100% A, the solvent A was then brought to 85% in 20 minutes, kept constant for 5 minutes, reduced to 75% in 10 minutes, kept constant for 8 minutes, finally brought to 0% (100% B) in 5 minutes and kept constant for 4 minutes, then returning to the initial conditions in 3 minutes. The gallic derivatives were calibrated at 280 nm with gallic acid, the ellagic derivatives at 254 nm with ellagic acid.

The chromatographic profiles relating to two fractions are provided by way of example: the first, liquid, obtained by nanofiltration concentration (Fraction 5.), having a density at 20° C. of 1.30 g/ml (FIG. 1), and the second obtained by spray drying starting from the latter (Fraction 8, FIG. 2) and subsequently re-dispersed in water.

As previously indicated, the fractions that can be used and are used for the purposes of the present invention are the following:
Fraction 3. Nanofiltration concentrate I
Fraction 5. Nanofiltration concentrate II
Fraction 7. Osmosis concentrate
Fraction 8. Powder respectively characterized by the following contents of chestnut tannin extract:
Fraction 3, having a content of 18% weight/weight;
Fraction 5, having a content of 50% weight/weight;
Fraction 7, having a content of 15% weight/weight;
Fraction 8, having a content of 100% weight/weight.

As indicated above, content of "chestnut tannin extract" refers to the sum of the concentrations, expressed in weight %, of derivatives of gallic acid, pure gallic acid, derivatives of ellagic acid, pure ellagic acid and all other components not belonging to these four categories, i.e.: pentosans, hexosans, oligosaccharides, hemicellulose, simple organic acids and inorganic salts, with respect to the total weight of the solution, in the case of a liquid fraction, or with respect to the total weight of the solid, in the case of powder.

Example 2

Preparation of a Formulation of Tannin Extract in Powder Form with Improved Re-Dispersibility The tannin extract in powder form (Fraction 8.) with a tannin content equal to 100% by weight obtained in Example 1, was mixed with the following products in the proportions indicated hereunder:

|  | weight % |
|---|---|
| Fraction 8. | 91 |
| Wetting agent based on sodium ligninsulfonate (Bretax S) | 5 |
| Anti-foam agent based on a mixture of organic compounds and mineral oil absorbed on an inorganic carrier, whose main component is "benzene, mono-C10-13-alkyl-derivative, distillation residues" (Defomex AP/188) | 1.5 |
| Dispersing agent based on sodium naphthalene sulfonate (Madeol AG/W90) | 2.5 |

The powder obtained has the same chemical characteristics as Fraction 8. (main component), but is characterized by a much higher re-dispersion capacity/property in water.

Figure 3:
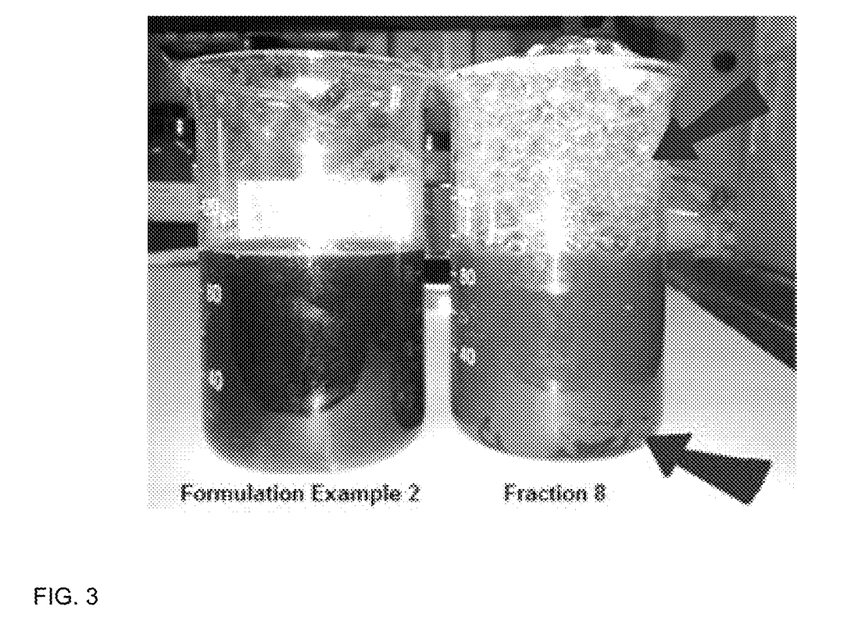
FIG. 3 is a comparison between the chestnut tannin extract obtained by Example 2 and the chestnut tannin extract of Fraction 8.

In order to demonstrate this, Fraction 8. and the formulation described above were taken and re-dispersed in water. FIG. 3 shows how the formulated powder (on the left, "Formulation Example 2") has a better re-dispersion than the original powder (on the right, "Fraction 8.)").

More specifically, a parallel experiment was carried out in which, at a temperature of 23° C., 100 g of both products in powder form were added to 900 g of water under constant stirring. The stirring time was 3 minutes for both, at the end of which the quantity of powder remaining undissolved was evaluated: the formulated powder did not show any residues, whereas with Fraction 8. as such, 27.7 g (corresponding to 27.7%) remained undissolved, forming clots and also creating foam (as can be seen from FIG. 3).

Example 3

Determination of the Acaricidal Activity of the Formulation of Example 2 Against *Tetranychus urticae* on Aubergines a) Activity of *Tetranychus urticae* on the Eggs (Expressed as % of Non-Verified Attack During the summer of 2016, a field test was carried out (locality Andria, region of Puglia) on aubergines (variety *Solanum melongena*).

The plant was treated with the following products:
Formulation of Example 2 dispersed in water and applied in a ratio of 0.5 kg/ha, dosing a volume equivalent to 1,000 l/ha;
Formulation of Example 2 dispersed in water and applied in a ratio of 1 kg/ha, dosing a volume equivalent to 1,000 l/ha;
Formulation of Example 2 dispersed in water and applied in a ratio of 2 kg/ha, dosing a volume equivalent to 1,000 l/ha;
Formulation of Example 2 dispersed in water and applied in a ratio of 4 kg/ha, dosing a volume equivalent to 1,000 l/ha;
Borneo® (commercial product based on etoxazole) diluted in water in a ratio of 500 ml/1,000 liters, dosing a volume equivalent to 1,000 l/ha. The dosage applied is the dosage recommended on the label.
A non-treated blank, i.e. a block of land not treated with any product, was then evaluated for comparative purposes.

Each block of land measured 1×15 m². For each treatment provided (a total of 6 including the "non-treated" block), 4 replications were effected, for a total of 24 blocks treated, following a randomized on-field treatment scheme of the blocks (RCB: Randomized Complete Block).

In the test, the formulation of Example 2 was tested, at different doses, and compared with a known anti-mite commercial product, more specifically the product Borneo®, against infestation by *Tetranychus urticae*, also known as Red spider, a mite well-known in the agricultural field, whose damage is extremely feared and conspicuous.

The applications were effected on June 25, July 5 and July 15 using a spray system directly on the leaves. The products were distributed with a dosage equal to 1,000 liters/ha, a total of 1,000 liters:10,000 m²×(15×4 m²)=6 liters were then sprayed for each test.

Figure 4:
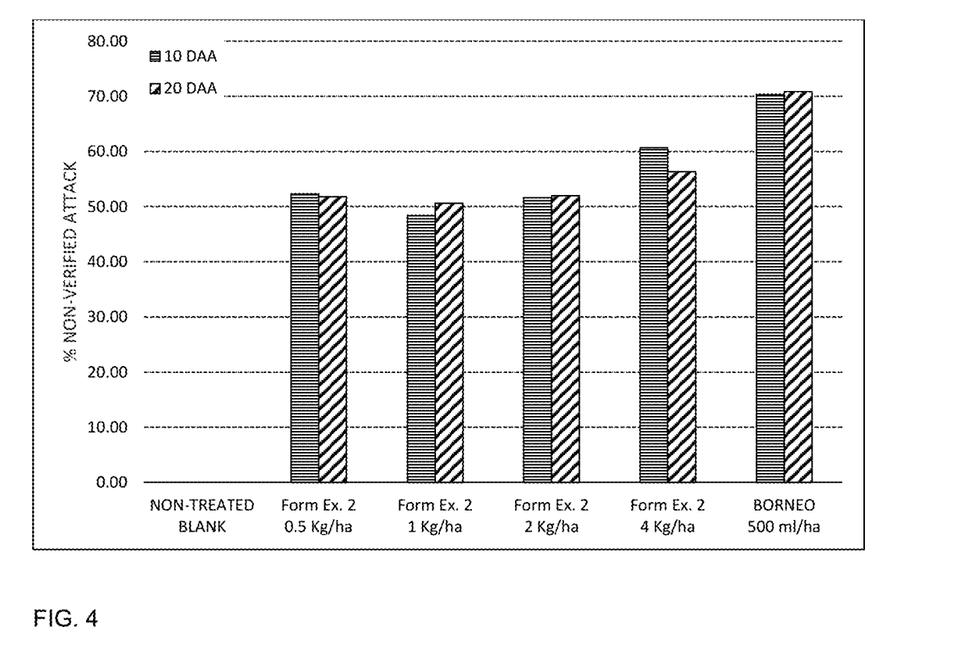
FIG. 4 depicts the results of a field test for determination of the acaricidal activity of the formulation of Example 2 against the eggs of *Tetranychus urticae* on aubergines.

The results are indicated in Table 1 and in the relative graph of FIG. 4.

The controls indicated in Table 1 were effected immediately before the subsequent applications of July 5 and July 15.

The percentages indicated in the Table correspond to the percentage of crop not attacked by the eggs of the mite: the percentage is equal to 100% when the crop was not attacked by the mite, whereas the percentage is equal to 0% when the whole crop was attacked by the mite.

The evaluation was effected on a sample of 25 leaves per block.

TABLE 1

Effectiveness of the Formulation of Example 2 on the eggs of *Tetranychus urticae* on aubergines

|  | 05-July | 15-July |
|---|---|---|
|  | Days after 1st application (DAA) (June 25) | |
|  | 10 | 20 |
| Non-treated blank | 0.00 | 0.00 |
| Formulation of Example 2 0.5 Kg/ha | 52.26 | 51.79 |
| Formulation of Example 2 1 Kg/ha | 48.39 | 50.62 |
| Formulation of Example 2 2 Kg/ha | 51.61 | 51.98 |
| Formulation of Example 2 4 kg/ha | 60.65 | 56.34 |
| BORNEO ® 500 ml/ha | 70.32 | 70.86 |

It is evident from the relative graph, in FIG. 4, that the tannin extract, even at its lowest dosage, is able to inhibit about 50% of attack by the eggs of *Tetranychus urticae*, whereas in the blocks of "untreated blanks" the value obtained for both tests were equal to zero, i.e. 100% attack.

A slight dosage/effect correlation can be noted with respect to the tannin extract: with an increase in the dosage, the response improves (even if not proportionally).

It should be pointed out that the difference in activity between the tannin extract (at the maximum dosage tested of 4 kg/ha) and the commercial reference product (Borneo) is rather small (12% less considering the average between the two tests). It is therefore absolutely reasonable to assume that higher dosages of tannin extract can lead to completely equivalent results, if not higher, in numerical terms, to those of the commercial reference product (Borneo), with the enormous advantage of using a completely natural product instead of a synthetic chemical product.

b) Activity on *Tetranychus urticae* Nymphs (Expressed as % of Non-Verified Attack)

Figure 5:
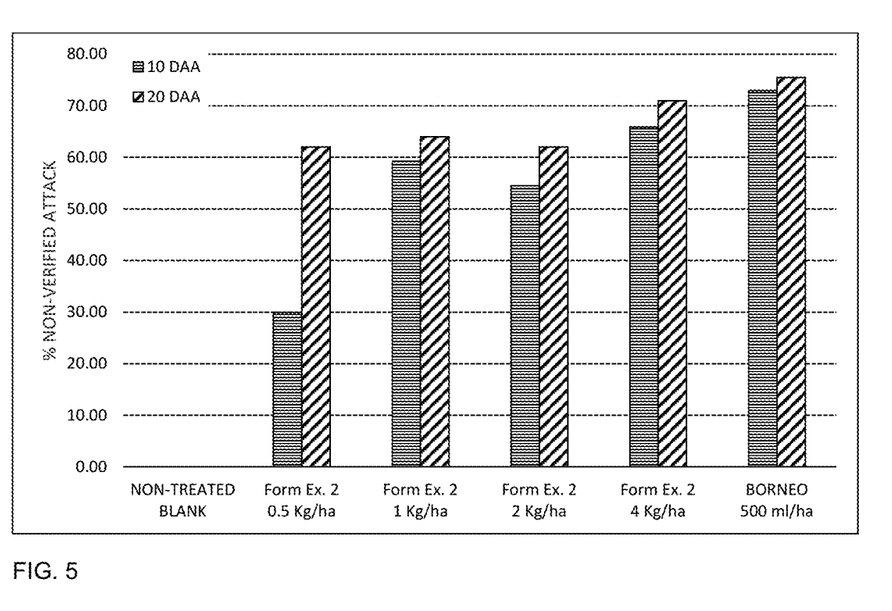
FIG. 5 depicts the results of a field test for determination of the acaricidal activity of the formulation of Example 2 against nymphs of *Tetranychus urticae* on aubergines.

The test was carried out as indicated in item a) and the results of the activity of the products tested on the nymphs are shown in Table 2 and in the relative graph of FIG. 5. The percentages indicated in the table correspond to the percentages of crop not attacked by the nymphs of mites: the percentage is equal to 100% when the crop was not attacked by the mite, whereas the percentage is equal to 0% when the whole crop was attacked by the mite.

The evaluation was carried out on a sample of 25 leaves per block.

TABLE 2

Effectiveness of the Formulation of Example 2 on the nymphs of *Tetranychus urticae* on aubergines

|  | 05-July | 15-July |
|---|---|---|
|  | Days after 1$^{st}$ application (DAA) (June 25) | |
|  | 10 | 20 |
| Non-treated blank | 0.00 | 0.00 |
| Formulation of Example 2 0.5 Kg/ha | 29.95 | 62.00 |
| Formulation of Example 2 1 Kg/ha | 59.24 | 64.00 |
| Formulation of Example 2 2 Kg/ha | 54.50 | 62.00 |
| Formulation of Example 2 4 kg/ha | 65.88 | 71.00 |
| BORNEO ® 500 ml/ha | 72.93 | 75.70 |

It is evident from the relative graph, in FIG. 5, that the chestnut tannin extract (excluding the lowest dosage, after the first 10 days of treatment) shows an activity completely comparable to that of the reference product.

Also in this case, the dosage/effect correlation is not particularly marked.

20 days after the first treatment, the difference in the activity between the tannin extract (at the maximum dosage tested of 4 kg/ha, and the commercial reference product (Borneo) is minimum. It is therefore reasonable to assume that higher dosages of chestnut tannin can lead to completely equivalent results, if not higher, in numerical terms, to those of the commercial reference product (Borneo) with the enormous advantage of using a completely natural product instead of a synthetic chemical product.

c) Activity on Adults of *Tetranychus urticae* (Expressed as % of Non-Verified Attack)

Figure 6:
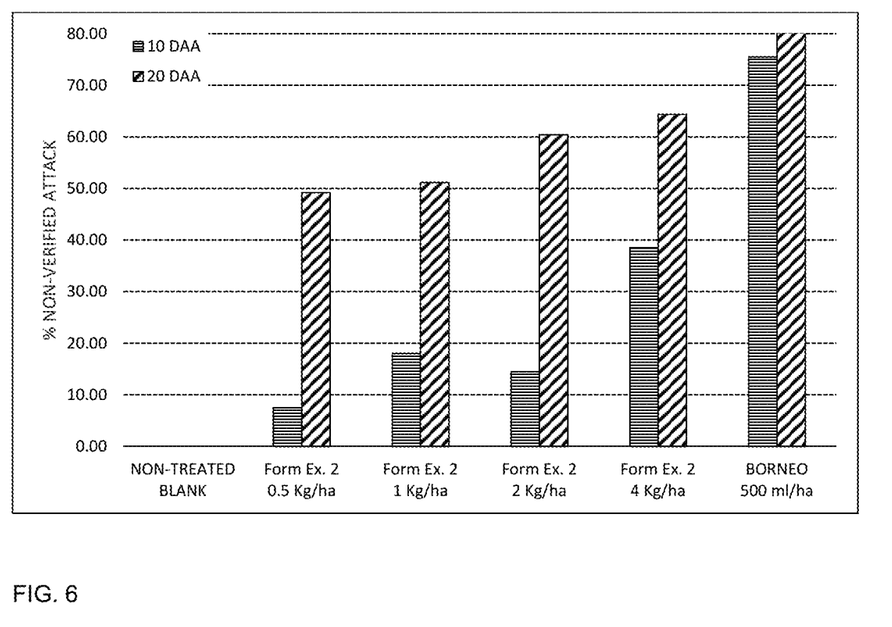
FIG. 6 depicts the results of a field test for determination of the acaricidal activity of the formulation of Example 2 against adults of *Tetranychus urticae* on aubergines.

The test was carried out as indicated in item a) and the results of the activity on the adults are shown in Table 3 and in the relative graph of FIG. 6. The percentages indicated in Table 3 correspond to the percentage of crop not attacked by the adult mites: the percentage is equal to 100% when the crop was not attacked by the mite, whereas the percentage is equal to 0% when the whole crop was attacked by the mite The evaluation was carried out on a sample of 25 leaves per block.

TABLE 3

Effectiveness of the Formulation of Exmple 2 on the adults of *Tetranychus urticae* on aubergines

|  | 05-July | 15-July |
|---|---|---|
|  | Days after 1$^{st}$ application (DAA) (June 25) | |
|  | 10 | 20 |
| Non-treated blank | 0.00 | 0.00 |
| Formulation of Example 2 0.5 Kg/ha | 7.5 | 49.41 |
| Formulation of Example 2 1 Kg/ha | 18.00 | 51.18 |
| Formulation of Example 2 2 Kg/ha | 14.50 | 60.42 |
| Formulation of Example 2 4 kg/ha | 38.50 | 64.38 |
| BORNEO ® 500 ml/ha | 75.50 | 80.98 |

It is evident from the relative graph, in FIG. 6, that the chestnut tannin extract, at the highest dosages and 20 days after the first treatment, shows an activity not far from that of the reference product. Also in this case the dosage/effect correlation is not particularly marked, but seems more linear with respect to the previous tests.

The considerable increase in the activity of the chestnut tannin extract with each passing day, should be noted however, which makes it completely reasonable to assume that in the subsequent 5/10 days of observation, the results obtained with the reference product, can be surpassed.

d) Activity on the Total Mobile Forms of *Tetranychus urticae* (Expressed as Total Number of the Mobile Forms)

Figure 7:
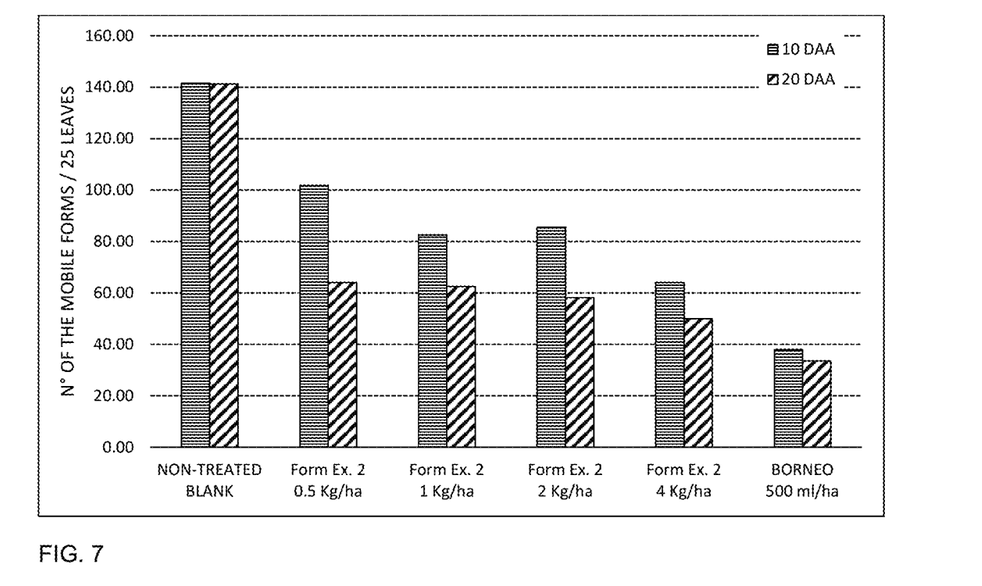
FIG. 7 depicts the results of a field test for determination of the acaricidal activity of the formulation of Example 2 against the total mobile forms of *Tetranychus urticae* on aubergines.

The test was carried out as indicated in item a) and the results of the activity on the total mobile forms are shown in Table 4 and in the relative graph of FIG. 7.

The numbers indicated in Table 4 therefore correspond to the total number of mobile forms, i.e. to the number of living forms still present on the crop: the closer the value found is to zero, the more effective the treatment has been, as most of the population of mites has been eradicated.

The evaluation was carried out on a sample of 25 leaves per block.

TABLE 4

Effectiveness of the Formulation of Example 2 on the total mobile forms of *Tetranychus urticae* on aubergines

|  | 05-July | 15-July |
|---|---|---|
|  | Days after 1$^{st}$ application (DAA) (June 25) | |
|  | 10 | 20 |
| Non-treated blank | 141.50 | 141.25 |
| Formulation of Example 2 0.5 Kg/ha | 101.75 | 64.00 |
| Formulation of Example 2 1 Kg/ha | 82.50 | 62.50 |
| Formulation of Example 2 2 Kg/ha | 85.50 | 58.25 |
| Formulation of Example 2 4 kg/ha | 64.00 | 50.00 |
| BORNEO ® ml/ha | 38.00 | 33.50 |

It is evident from the relative graph, in FIG. 7, that chestnut tannin extract, in general, allows the overall population of mites present on the crop to be controlled, giving the best results 20 days after the first treatment.

A more pronounced dosage/effect correlation can be noted with respect to the previous tests, even if not linear.

e) Evaluation of the General Phototoxicity Shown by the Products Tested

The test was carried out as indicated in item a).

The objective of this test is to evaluate and quantify any form of phytotoxicity (chlorosis, necrosis, abnormal staining, whitening, etc.) that can appear on the crop under examination following application of the products tested, 10 and 20 days after the first treatment. The values indicated in Table 5 correspond to the percentage of plant that has suffered damage (chlorosis, necrosis, abnormal staining, whitening, etc.): the closer the value found is to zero, the more the treatment has proved to be non-phytotoxic.

TABLE 5

Evaluation of the impact of the Formulation of Example 2 on the general phytotoxicity on aubergines

|  | 05-July | 15-July |
|---|---|---|
|  | Days after $1^{st}$ application (DAA) (June 25) | |
|  | 10 | 20 |
| Non-treated blank | 0.00 | 0.00 |
| Formulation of Example 2 0.5 Kg/ha | 0.00 | 0.00 |
| Formulation of Example 2 1 Kg/ha | 0.00 | 0.00 |
| Formulation of Example 2 2 Kg/ha | 0.00 | 0.00 |
| Formulation of Example 2 4 kg/ha | 0.00 | 0.00 |
| BORNEO ® 500 ml/ha | 0.00 | 0.00 |

It is evident that the tannin extract, object of the invention, does not show any phytotoxicity with respect to the crop, at any dosage. Chlorosis, necrosis, abnormal staining, whitening, were tested.

Example 4

Determination of the Acaricidal Activity of the Formulation of Example 2 Against *Tetranychus* sp. on soybeans a) Activity on the Eggs of *Tetranychus* sp. (Expressed as % of Non-Verified Attack In August 2016, a field test was carried out (locality Pettorazza Grimani, province of Rovigo, region Veneto) on soybeans (variety *Glycine Max*).

The plant was treated with the following products:
Formulation of Example 2 dispersed in water and applied in a ratio of 1 kg/ha, dosing a volume equivalent to 600 l/ha;
Formulation of Example 2 dispersed in water and applied in a ratio of 2 kg/ha, dosing a volume equivalent to 600 l/ha
Formulation of Example 2 dispersed in water and applied in a ratio of 4 kg/ha, dosing a volume equivalent to 600 l/ha
Formulation of Example 2 dispersed in water and applied in a ratio of 8 kg/ha, dosing a volume equivalent to 600 l/ha;
MATACAR® FL (commercial product based on Hexythiazox) diluted in water at a ratio of 20 g/100 liters, dosing a volume equivalent to 600 l/ha. The dosage applied is that recommended in the label.

A non-treated blank, i.e. a block of land not treated with any product, was also evaluated for comparative purposes.

Each block of land measured 3×10 m2. 4 replications were effected for each treatment (6, including the "non-treated" block) for a total of 24 blocks tested, following a randomized on-field treatment scheme of the blocks (RCB: Randomized Complete Block).

In the test, the formulation of Example 2 was tested, at different doses, and compared with a known anti-mite commercial product, more specifically the product Matacar® FL, against infestation by *Tetranychus* sp., a mite well-known in the agricultural field, whose damage is extremely feared and conspicuous.

The products were distributed with a dosage equivalent to 600 liters/ha, therefore a total of 600 liters: 10,000 $m^2$× (30×4 $m^2$)=7.2 liters were sprayed for each test. The only application was effected on August 11 using a spray system directly on the leaves. On August 13, August 18 and August 25 the tests shown in the following Tables were carried out.

Figure 8:
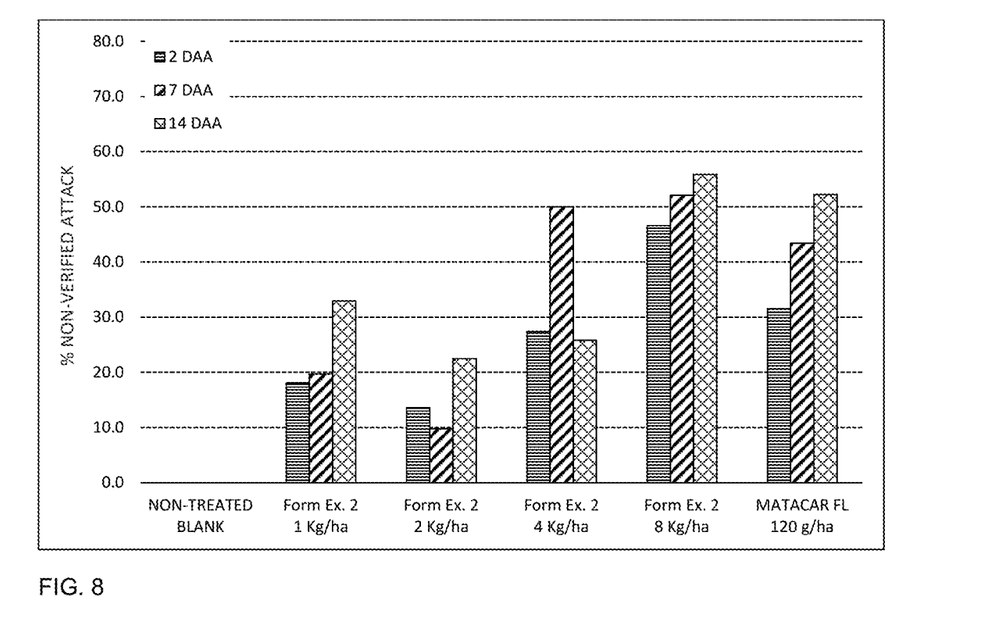
FIG. 8 depicts the results of a field test for determination of the acaricidal activity of the formulation of Example 2 against the eggs of *Tetranychus* sp. on soybeans.

The results of the activity on the eggs of *Tetranychus* sp. on soybeans are shown in Table 6 and in the relative graph of FIG. 8. The percentages indicated in Table 6 correspond to the percentages of crop which was not attacked by the eggs of the mite: if the crop was not attacked by the mite, the percentage is equal to 100%, whereas if the whole crop was attacked, the percentage is 0%.

The evaluation was carried out on a sample of 25 leaves per block.

TABLE 6

Effectiveness of the Formulation of Example 2 on eggs of *Tetranychus* sp. on soybeans

|  | 13-Aug. | 18-Aug. | 25-Aug. |
|---|---|---|---|
|  | Days after application (DAA) (August 11) | | |
|  | 2 | 7 | 14 |
| Non-treated blank | 0.0 | 0.0 | 0.0 |
| Formulation of Example 2 1 Kg/ha | 18.1 | 19.7 | 32.9 |
| Formulation of Example 2 2 Kg/ha | 13.6 | 9.8 | 22.5 |
| Formulation of Example 2 4 kg/ha | 27.4 | 50.0 | 25.8 |
| Formulation of Example 2 8 kg/ha | 46.6 | 52.1 | 55.9 |
| MATACAR ® FL 120 g/ha | 31.5 | 43.4 | 52.2 |

It is evident from the relative graph, in FIG. 8, that the chestnut tannin extract (already at a dosage of 4 kg/ha) shows a completely competitive activity with respect to the reference product, even as far as surpassing its effectiveness at the maximum dosage in all the tests effected.

The dosage/effect correlation is reasonably good even if not perfectly linear.

Again, it should be noted that the chestnut tannin extract, obtained according to the process described, starting from a natural raw material and without the aid of chemical substances, demonstrates its capacity of controlling attack by mites on a crop of great diffusion and importance, better than established synthesis products on the market.

b) Activity on Mobile Forms of *Tetranychus* sp. (Expressed as % of Non-Verified Attack)

Figure 9:
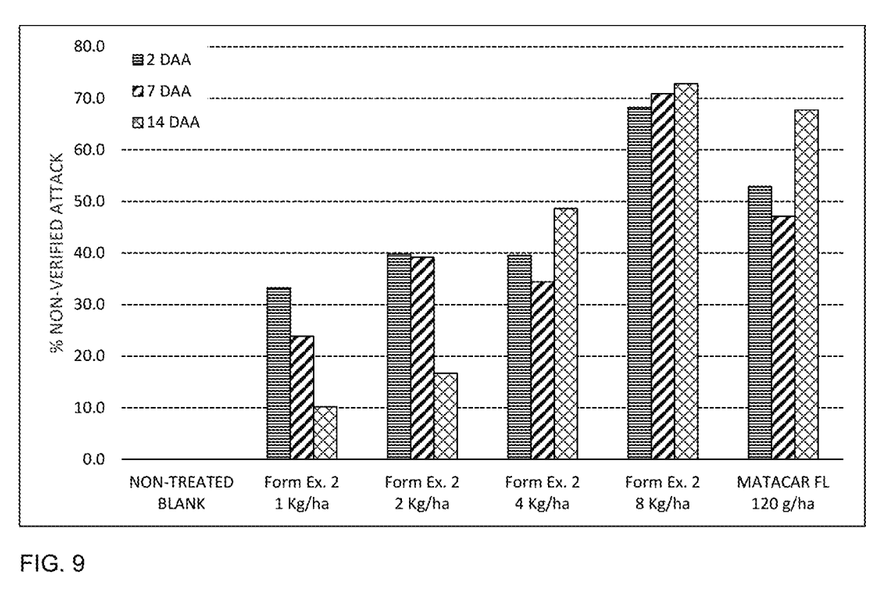
FIG. 9 depicts the results of a field test for determination of the acaricidal activity of the formulation of Example 2 against mobile forms of *Tetranychus* sp. on soybeans.

The test was carried out as indicated in item a) and the results of the activity of the products tested on the mobile forms are indicated in Table 7 and in the relative graph of FIG. 9. The percentages indicated in Table 7 correspond to the percentages of crop not attacked by the mobile forms of the mites: if the crop was not attacked by the mite, the percentage is equal to 100%, whereas if the whole crop was attacked, the percentage is 0%.

The evaluation was carried out on a sample of 25 leaves per block.

TABLE 7

Effectiveness of the Formulation of Example 2 on mobile forms of *Tetranychus* sp. on soybeans

|  | 13-Aug. | 18-Aug. | 25-Aug. |
|---|---|---|---|
|  | Days after application (DAA) (August 11) | | |
|  | 2 | 7 | 14 |
| Non-treated blank | 0.0 | 0.0 | 0.0 |
| Formulation of Example 2 1 Kg/ha | 33.2 | 23.9 | 10.2 |
| Formulation of Example 2 2 Kg/ha | 39.8 | 39.2 | 16.7 |
| Formulation of Example 2 4 kg/ha | 39.5 | 34.4 | 48.6 |
| Formulation of Example 2 8 kg/ha | 68.2 | 70.9 | 72.8 |
| MATACAR ® FL 120 g/ha | 52.9 | 47.1 | 67.7 |

It is evident from the relative graph, in FIG. 9, that the chestnut tannin extract at a dosage of 8 kg/ha is much more performing than the reference product in all the tests effected.

The dosage/effect correlation is fairly good and relatively linear.

This test b) also confirms what is indicated above for test a): the chestnut tannin extract demonstrates, at the highest dosage under examination, a much better control of the attack of the mite with respect to Matacar FL, whose dosage of 120 g/ha is that recommended on the label.

c) Activity on the Total Mobile Forms of *Tetranychus* sp. (Expressed as Total Number of Mobile Forms)

Figure 10:
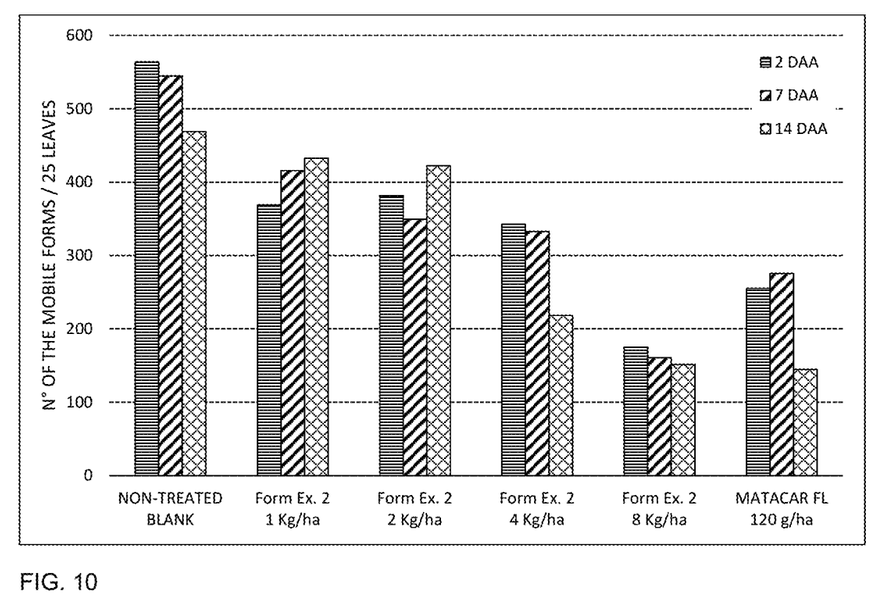
FIG. 10 depicts of the results of a field test for determination of the acaricidal activity of the formulation of Example 2 against the total mobile forms of *Tetranychus* sp. on soybeans.

The test was carried out as indicated in item a) and the results of the activity on the total mobile forms are indicated in table 8 and in the relative graph of FIG. 10.

The numbers indicated in Table 8 therefore correspond to the number of total mobile forms, i.e. to the number of living forms still present on the crop: the closer the value found is to zero, the more effective the treatment has been, as most of the population of mites has been eradicated.

The evaluation was carried out on 25 leaves per block.

TABLE 8

Effectiveness of the Formulation of Example 2 on the total mobile forms of *Tetranychus* sp. on soybeans

|  | 13-Aug. | 18-Aug. | 25-Aug. |
|---|---|---|---|
|  | Days after application (DAA) (August 11) | | |
|  | 2 | 7 | 14 |
| Non-treated blank | 563.6 | 544.8 | 468.8 |
| Formulation of Example 2 1 Kg/ha | 368.8 | 415.7 | 432.8 |
| Formulation of Example 2 2 Kg/ha | 381.5 | 349.3 | 422.3 |
| Formulation of Example 2 4 kg/ha | 342.6 | 332.6 | 218.3 |

TABLE 8-continued

Effectiveness of the Formulation of Example 2 on the total mobile forms of *Tetranychus* sp. on soybeans

|  | 13-Aug. | 18-Aug. | 25-Aug. |
|---|---|---|---|
|  | Days after application (DAA) (August 11) | | |
|  | 2 | 7 | 14 |
| Formulation of Example 2 8 kg/ha | 174.8 | 160.7 | 151.5 |
| MATACAR ® FL 120 g/ha | 255.2 | 275.3 | 144.8 |

It is evident from the relative graph, in FIG. 10, that the chestnut tannin extract at a dosage of 8 kg/ha is much more performing than the reference product in all the tests effected.

The dosage/effect correlation is good at the highest dosages. The results indicated above for tests a) and b) are confirmed.

d) Evaluation of the General Phytotoxicity Shown by the Products Tested

The test was carried out as indicated in item a). The objective of this test is to evaluate and quantify any form of phytotoxicity (chlorosis, necrosis, abnormal staining, whitening, etc.) that can appear on the crop under examination following application of the products tested, at time 0 and 2 and 7 days after the treatment.

The values indicated in Table 9 correspond to the percentage of plant that has suffered damage (chlorosis, necrosis, abnormal staining, whitening, etc.): the closer the value found is to zero, the more the treatment has proved to be non-phytotoxic.

TABLE 9

|  | 11-Aug | 13-Aug | 18-Aug |
|---|---|---|---|
|  | Days after application (DAA) (August 11) | | |
|  | 0 | 2 | 7 |
| Non-treated blank | 0.0 | 0.0 | 0.0 |
| Formulation of Example 2 1 Kg/ha | 0.0 | 0.0 | 0.0 |
| Formulation of Example 2 2 Kg/ha | 0.0 | 0.0 | 0.0 |
| Formulation of Example 2 4 Kg/ha | 0.0 | 0.0 | 0.0 |
| Formulation of Example 2 8 Kg/ha | 0.0 | 0.0 | 0.0 |
| MATACAR ® FL 120 g/ha | 0.0 | 0.0 | 0.0 |

It is evident that the tannin extract object of the invention, at any dosage, does not show any phytotoxicity with respect to the crop. Chlorosis, necrosis, abnormal staining, whitening, were tested.

Captions

FIG. 1

Figure 1:
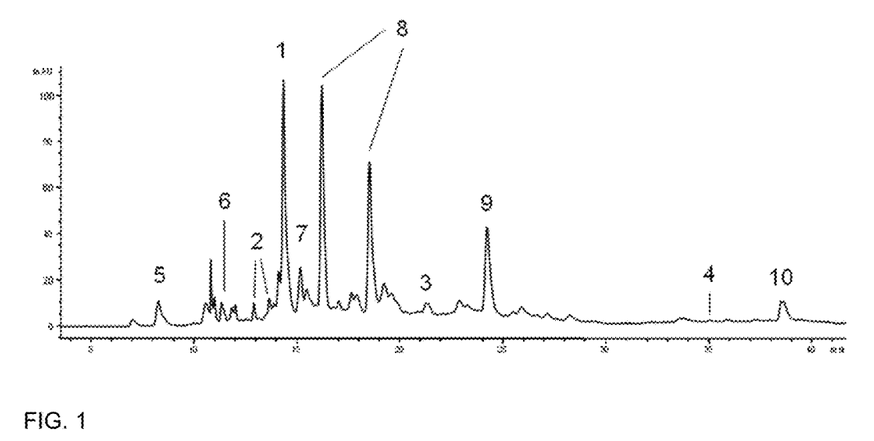
FIG. 1 is an exemplary chromatographic profile of the chestnut tannin extract of Fraction 5 obtained by nanofiltration concentration.

Chromatographic profile relating to Fraction 5, registered at 280 nm: 1. Gallic acid, 2. Mono-galloyl glucose; 3. Gallotannin m/z 677; 4. Penta-galloyl glucose; 5. Galloyl-HHDP glucose; 6. HHDP glucose; 7. Ellagitannin m/z 925; 8 Castalagin/vescalagin; 9. Ellagitannin m/z 1085; 10. Ellagic acid.

FIG. 2

Figure 2:
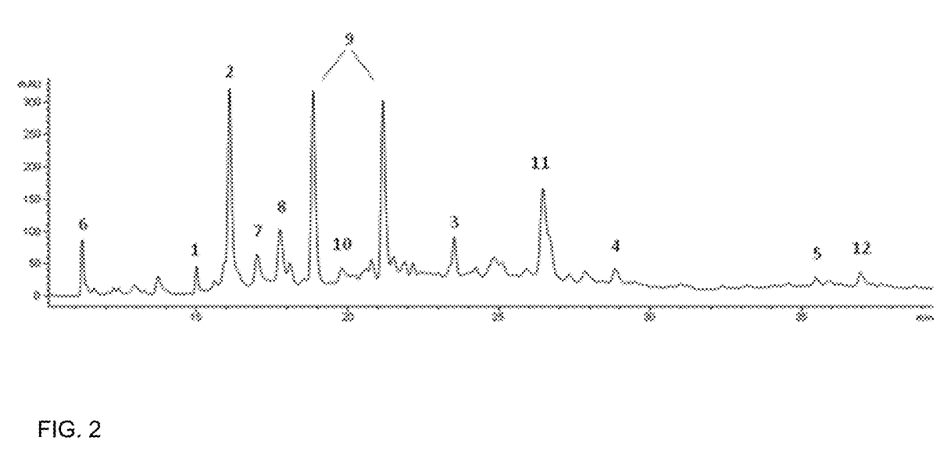
FIG. 2 is an exemplary chromatographic profile of the chestnut tannin extract of Fraction 8 obtained by spray drying and subsequent re-dispersing in water.

Chromatographic profile relating to the aqueous dispersion of Fraction 8. (spray dried) registered at 280 nm: 1.

Mono-galloyl glucose; 2. Gallic acid 3. Digalloyl glucose; 4. Trigalloyl glucose; 5. Tetragalloyl glucose; 6. Peduncula-gina isomer; 7 Ellagitannin m/z 683; 8. Ellagitannine m/z 925; 9. Castalagin/vescalagin; 10 Ellagitannine m/z 613; 11. Galloyl-HHDP glucose; 12. Ellagic acid.

The invention claimed is:

1. A method of controlling, limiting, rejecting or destroying arachnids comprising applying a chestnut tannin extract (*Castanea sativa* Mill.), as a non-phytotoxic acaricidal agent, to an agricultural crop, to soil or by seed tanning, alone or in a mixture with other active ingredients having an acaricidal activity.

2. The method according to claim 1, comprising obtaining the chestnut tannin extract by means of a process, without the use of chemical additives, which comprises an extraction step in water by leaching starting from a vegetable biomass, filtering, and concentrating with physical means.

3. The method according to claim 2, wherein the physical means are nanofiltration and/or reverse osmosis.

4. The method according to claim 2, wherein the chestnut tannin extract is in liquid or solid form.

5. The method according to claim 2 wherein the vegetable biomass comprises any part of the chestnut plant selected from the group consisting of trunk, leaves, branches or bark or any combination thereof.

6. The method according to claim 1 comprising applying the chestnut tannin extract without other active ingredients.

7. The method according to claim 1 wherein the chestnut tannin extract comprises a fraction corresponding to a concentrate obtained from a first nanofiltration step, a fraction corresponding to a concentrate obtained from a second nanofiltration step, a fraction corresponding to a concentrate obtained from a reverse osmosis step, or a fraction corresponding to a powder obtained at the end of a drying step, alone or in any combination thereof.

8. The method according to claim 1 comprising applying the chestnut tannin extract, alone or in a mixture with other active ingredients having an acaricidal activity, in the liquid or solid state to agricultural crops for prevention or treatment.

9. The method according to claim 1, comprising applying the chestnut tannin extract in a quantity ranging from 100 g to 10,000 g per hectare of agricultural crop.

10. A non-phytotoxic agronomic acaricidal formulation, comprising chestnut tannin extract present in a quantity ranging from 90 to 95% by weight, one or more surfactants present in a quantity ranging from 2 to 6% by weight, one or more dispersants present in a quantity ranging from 2 to 6% by weight and an anti-foam agent present in a quantity ranging from 1 to 2% by weight, all percentages based on the total weight of the formulation, wherein the chestnut tannin extract is obtained by means of a process, without the use of chemical additives, which comprises an extraction step in water by leaching, starting from a vegetable biomass, filtering, and concentrating with physical means.

11. The formulation according to claim 10, wherein the chestnut tannin extract is chestnut tannin extract in powder form mixed with a surfactant based on sodium alkyl sulfonate, a dispersant based on alkyl naphthalene sulfonates and a chemically and agronomically acceptable anti-foam agent.

12. The formulation according to claim 10, wherein the chestnut tannin extract is in powder form and the surfactant is a wetting agent.

13. The formulation according to claim 10, wherein said formulation also comprises one or more additional active ingredients.

14. A method for controlling mites comprising applying the formulation according to claim 11 to an agricultural crop, to soil or by seed tanning.

15. The method of claim 14, comprising applying the formulation to an agricultural crop, in the liquid or solid state, for prevention or treatment.

16. The method of claim 2 wherein the process further comprises a final drying step.

17. The method of claim 4 wherein the chestnut tannin extract is in solid form.

18. The method of claim 9 comprising applying the chestnut tannin extract in a quantity ranging from 500 g to 8,000 g per hectare of agricultural crop.

19. The formulation of claim 10 wherein the process further comprises a final drying step.

20. The formulation of claim 13, wherein at least one of the one or more additional active ingredients have an acaricidal activity.

* * * * *